US006942270B1

(12) United States Patent
Mulvihill

(10) Patent No.: US 6,942,270 B1
(45) Date of Patent: Sep. 13, 2005

(54) SEAT WELL STORAGE

(75) Inventor: James Mulvihill, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/874,731

(22) Filed: Jun. 22, 2004

(51) Int. Cl.$^7$ .............................. B60J 7/00; F25B 21/02
(52) U.S. Cl. .................. 296/37.16; 296/37.8; 224/549; 224/543; 220/6
(58) Field of Search ............................ 296/37.16, 37.1, 296/37.5, 37.8, 37.14; 224/549, 496, 497, 224/498, 499, 539, 543, 544; 220/9.1, 9.2, 220/9.3, 6

(56) References Cited

U.S. PATENT DOCUMENTS

| 3,165,247 | A | * | 1/1965 | Burns ......................... 224/275 |
| 4,752,096 | A | * | 6/1988 | Ishikawa ................. 296/37.16 |
| 4,783,113 | A | * | 11/1988 | Padlo ..................... 296/136.06 |
| 4,884,733 | A | | 12/1989 | Geeves |
| 4,892,210 | A | | 1/1990 | Kupersmit |
| 5,025,964 | A | | 6/1991 | Phirippidis |
| 5,054,668 | A | | 10/1991 | Ricchiuti |
| 5,181,814 | A | | 1/1993 | Woods et al. |
| 5,234,116 | A | | 8/1993 | Kristinsson et al. |
| 5,366,189 | A | | 11/1994 | Thompson |
| 5,392,972 | A | | 2/1995 | Caruso et al. |
| 5,484,091 | A | | 1/1996 | Malinowski et al. |
| 5,492,257 | A | | 2/1996 | Demick |
| 5,520,316 | A | | 5/1996 | Chen |
| 5,538,148 | A | | 7/1996 | Indyk |
| 5,599,054 | A | * | 2/1997 | Butz et al. .................. 296/37.8 |
| 5,628,543 | A | * | 5/1997 | Filipovich et al. .......... 297/113 |
| 5,713,502 | A | | 2/1998 | Dixon |
| 5,924,611 | A | | 7/1999 | Mizuno |
| 5,951,085 | A | * | 9/1999 | Fukatsu ..................... 296/37.8 |
| 6,041,987 | A | | 3/2000 | Tickoo |
| 6,056,177 | A | | 5/2000 | Schneider |
| 6,092,704 | A | | 7/2000 | Baumeister |
| 6,149,040 | A | | 11/2000 | Walker |
| 6,206,224 | B1 | | 3/2001 | Potts et al. |
| 6,290,277 | B1 | | 9/2001 | Spykerman et al. |
| 6,308,873 | B1 | | 10/2001 | Baldas et al. |
| 6,375,055 | B1 | | 4/2002 | Spykerman et al. |
| 6,502,731 | B1 | | 1/2003 | Gehring et al. |
| 6,520,364 | B2 | | 2/2003 | Spykerman et al. |
| 6,550,654 | B1 | | 4/2003 | Crago |
| 6,666,362 | B1 | | 12/2003 | Letrudet |
| 6,676,185 | B2 | * | 1/2004 | Gehring et al. ............ 296/37.5 |
| 2002/0145022 | A1 | | 10/2002 | Nguyen et al. |
| 2003/0090119 | A1 | | 5/2003 | Bateman |
| 2003/0178869 | A1 | | 9/2003 | Adams |

FOREIGN PATENT DOCUMENTS

JP          4-183647      *  6/1992

* cited by examiner

Primary Examiner—Joseph D. Pape
(74) Attorney, Agent, or Firm—Bill Panagos

(57) ABSTRACT

A cargo management system for a motor vehicle with at least one seat well comprising a pouch of being deployed in said seat well. This pouch provides a lightweight, easy to use, unique storage management system for seat wells, a part of the vehicle which normally would not be an ideal storage area.

7 Claims, 4 Drawing Sheets

Fig.1
Fig.2
Fig.3
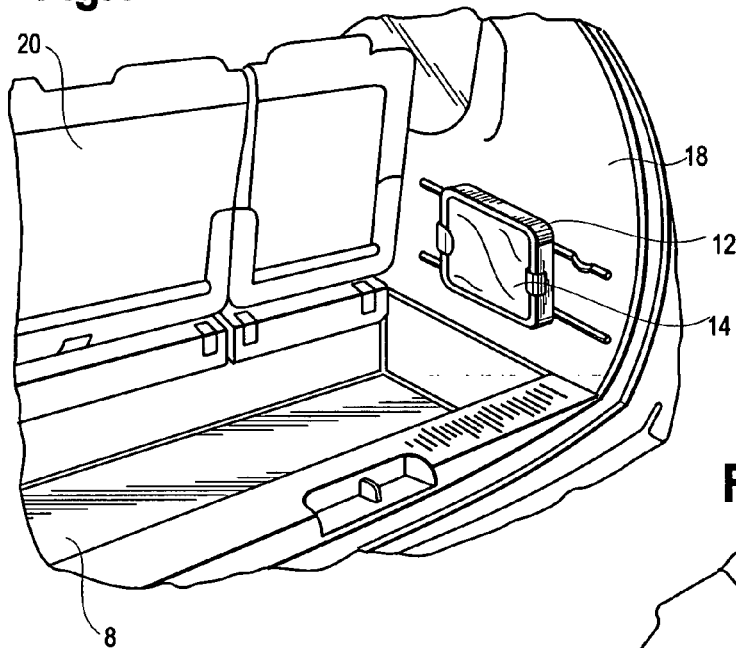
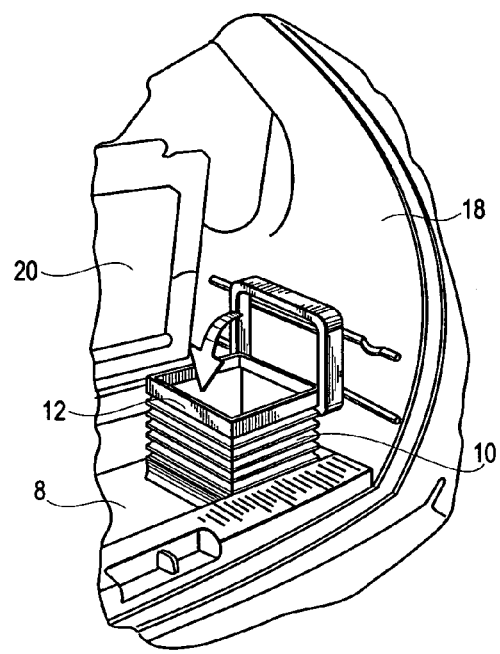
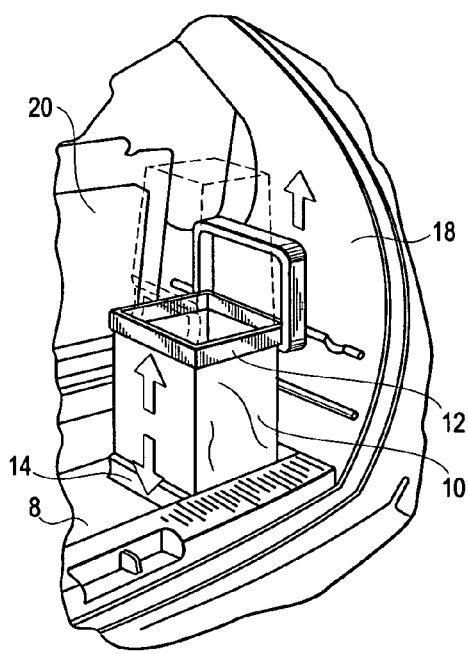

SEAT WELL STORAGE

FIELD OF INVENTION

This invention relates to the seat well space of a motor vehicle. More specifically, it relates to a cargo management system utilizing the seat well space for a motor vehicle.

BACKGROUND OF INVENTION

Motors vehicles are generally equipped with areas for cargo storage. Some vehicles are equipped with trunk space, while others are equipped with storage areas behind the last row of seating. Consumer demand has driven the need to design motor vehicles with adequate cargo storage areas. However, with this demand comes the need for cargo management systems.

Many times, loose or smaller items are stored in the cargo space. While the vehicle is in motion, these loose or smaller items tend to move or roll around in the cargo space. This is undesirable because the items might be damaged or cause damage to the vehicle. As a result, systems have been developed to manage the cargo space and control items that are placed in that space.

While these systems have been effective in managing trunk space or the space behind the last row of seats, none have been able to manage the space that seat wells create. Some motor vehicles now allow for seats to be folded and stowed in the floor of the vehicle. When the seats are deployed, a seat well is left open and empty. When the seats are deployed, this seat well makes an ideal area to store cargo. However, the cargo, if just placed in the seat well, would roll around if not contained somehow. This invention solves the problem of cargo not being secured when stored. This cargo management system solves the problem of cargo storage within a seat well in an easy and cost-effective manner.

SUMMARY OF INVENTION

This invention relates to a cargo management system for a motor vehicle with at least one seat well comprising a pouch capable of being deployed in the seat well. The pouch further comprises a flexible material. This pouch further comprises a frame attached to the pouch, a bottom plate, a lid, and a point of attachment. This pouch is to be mounted in at least one location on the quarter panel on the motor vehicle.

When the seat well is open, the pouch can be deployed into it and thereby create an effective cargo management system to organize the seat well. When the seats are stowed in the seat well or when the user decides that the pouch is not needed, the pouch can be stowed easily on the quarter panel on the motor vehicle.

The pouch further comprises straps or pockets. The straps and pockets simply add to the uses this pouch has as a cargo management system.

DETAILED DESCRIPTION OF THE DRAWINGS

FIG. 1 depicts the pouch stowed in the quarter panel of the motor vehicle.

FIG. 2 depicts the pouch deployed at one height in the seat well.

FIG. 3 depicts the pouch deployed in the seat well at an alternative height to FIG. 2.

DETAILED DESCRIPTION OF THE PREFERRED EMBODIMENT

Figure 8:
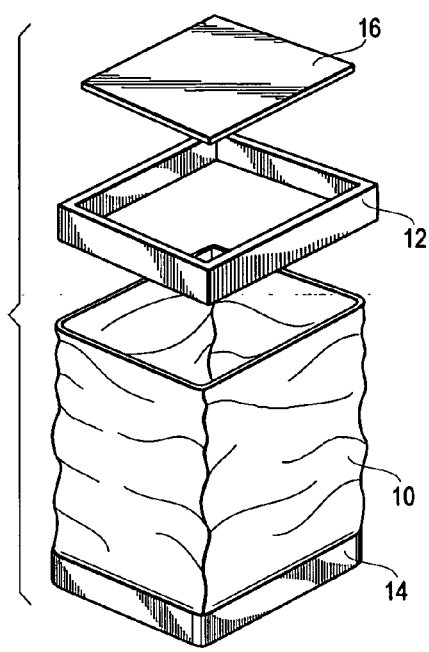
FIG. 8 depicts an exploded view of this cargo management system detailing the lid, frame, pouch, and bottom plate.
Figure 11:
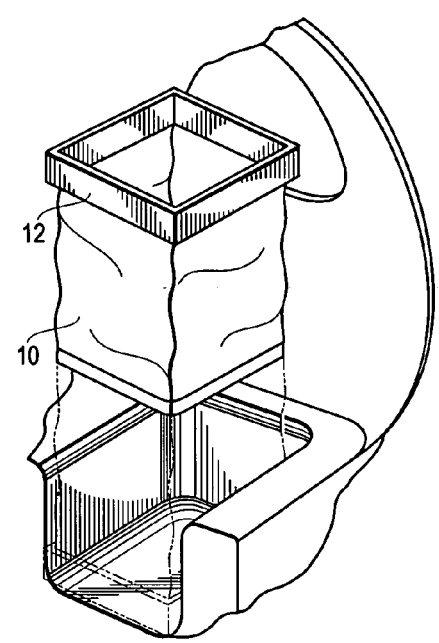
FIG. 11 depicts the pouch moving through an adjustable height.

This cargo management system for a motor vehicle having at least one seat well 8 comprises a pouch 10 capable of being deployed in the seat well 8. This pouch 10 comprises a flexible material. The pouch 10 further comprises a frame 12 attached to said pouch 10, a bottom plate 14, a lid 16, and a point of attachment 26. FIG. 8 depicts a view of the pouch 10 with its frame 12, lid 16, and bottom plate 14.

In some motor vehicles, the seats 20 are able to be deployed from or stowed in the floor of the motor vehicle. When the seats 20 are deployed, a seat well 8 is left open. When the seat well 8 is open, this invention can be deployed into the open area from its stowed position.

Figure 9:
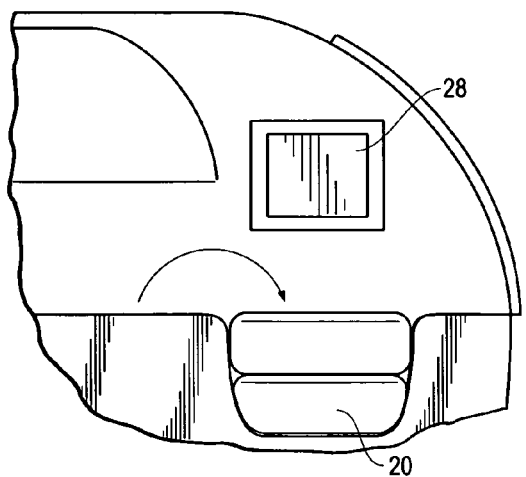
FIG. 9 depicts a seat in the stowed position and the pouch in a stowed position on the quarter panel of the motor vehicle.
Figure 10:
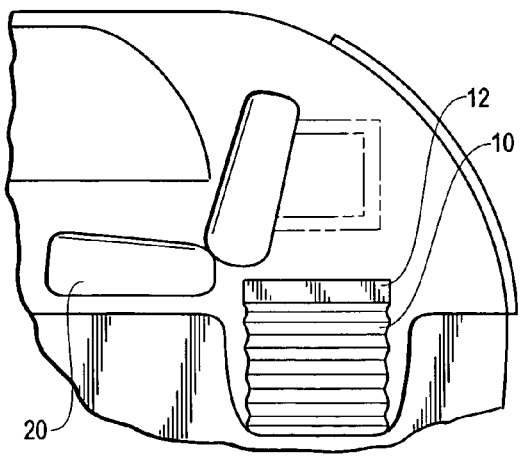
FIG. 10 depicts a seat in its deployed position and also shows the pouch in its deployed position and its stowed position.

FIG. 1 is a view of the pouch 10 in its stowed position. The pouch 10 with its frame 12, lid 16, and bottom plate 14 are folded and snapped into a stowed position and held into place on the quarter panel by a point of attachment 26. Generally a user will keep the pouch 10 in its stowed position when the seat 20 is stowed in the seat well 8 or when the user does not desire to use this pouch 8. FIGS. 9 and 10 best depicts those circumstances.

Figure 4:
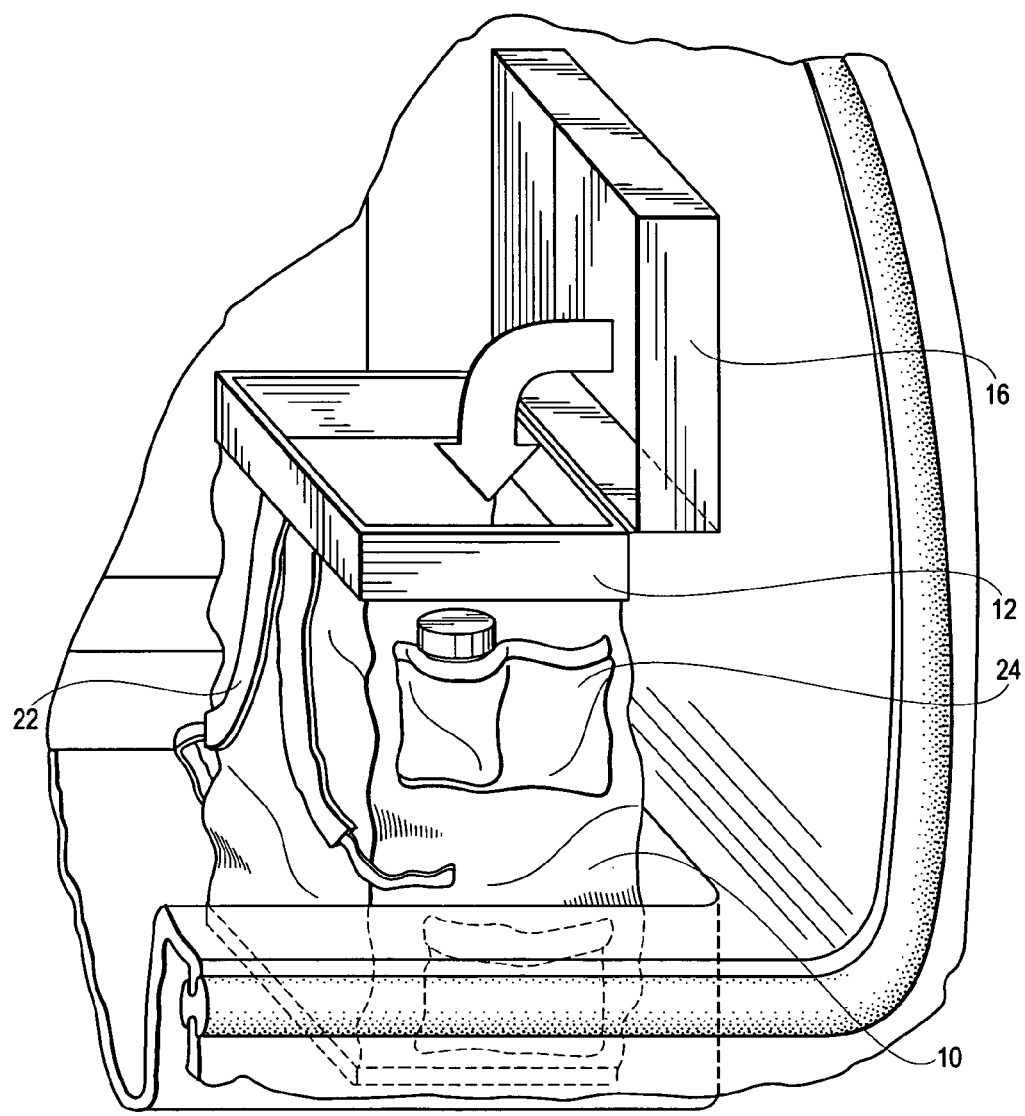
FIG. 4 depicts the pouch deployed in the seat well and shows the pouch with straps and pockets.
Figure 5:
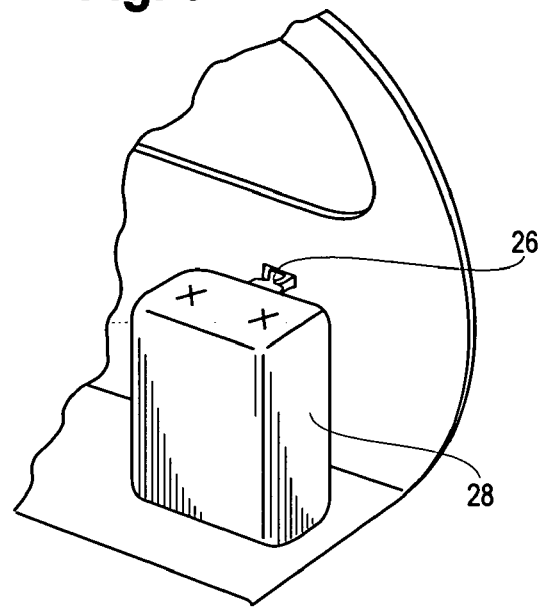
FIG. 5 depicts the stowed pouch, in partial view so that the point of attachment is more clearly viewed.
Figure 6:
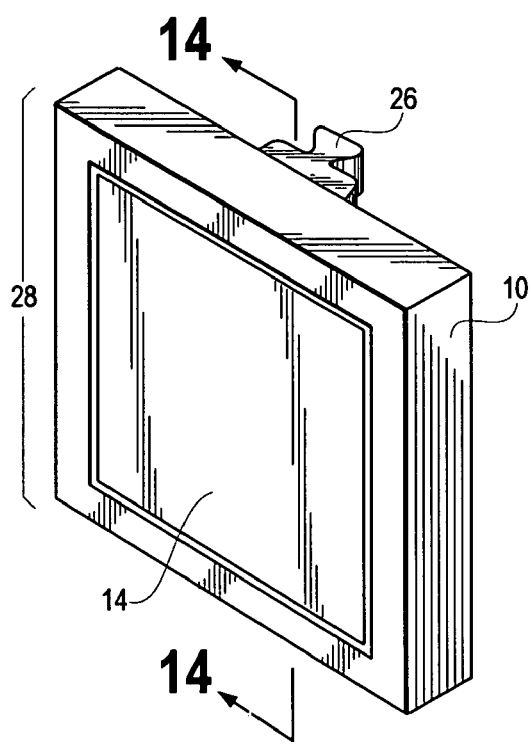
FIG. 6 depicts the stowed pouch not attached to the quarter panel of the motor vehicle.
Figure 7:
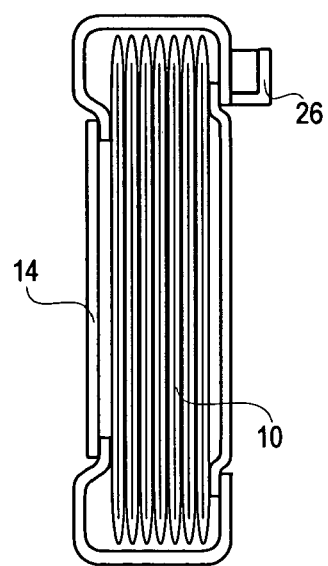
FIG. 7 depicts a cross-sectional view of the stowed pouch.

FIGS. 2–4 depict the pouch 10 in its deployed position. Generally the pouch 10 is held into place on the quarter panel 18 by the point of attachment 26. This point of attachment 26 can be a clip, snap, hook, or other type of attaching system. The point of attachment 26 helps to hold the pouch 10 with its frame 12, lid 16, and bottom plate 14 in place when deployed and mounts the pouch 10 with its frame 12, lid 16, and bottom plate 14 out of the way when stowed.

When the seat 20 is deployed and the seat well 8 is open, the pouch 10 can be deployed by a user. The pouch 10 is simply opened and fills the seat well 8 area, as seen in FIGS. 2, 3 and 10. Items can then be placed in the pouch 10. The pouch 10 can be mounted at varying heights and positions by its point of attachment 26 to better suit a users needs. FIG. 2 depicts the pouch 10 at a lower height while FIG. 3 depicts the pouch 10 at a higher height.

The pouch 10 further comprises straps 22 or pockets 24 as seen in FIG. 4. The straps can be used by a user who wants to remove the pouch 10 from the motor vehicle for easy transport of cargo. The pockets 24 can be added for further storage space.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A cargo management system for a motor vehicle with at least one seat well comprising:
   a pouch movable between a stowed position and a deployed position, said pouch having an open top end and a bottom plate, said open top end and said bottom plate disposed adjacent each other and generally vertical when said pouch is in the stowed position, said open top end being generally horizontal and said bottom plate disposed in spaced relation to said open top end and in said seat well when said pouch is in the deployed position.

2. A cargo management system for a motor vehicle with at least one seat well as in claim 1, wherein said pouch further comprises a flexible material.

3. A cargo management system for a motor vehicle with at least one seat well as in claim 1 wherein said pouch further comprises a frame, a lid and a point of attachment.

4. A cargo management system for a motor vehicle with at least one seat well as in claim 3, wherein said pouch is capable of being deployed when the seat in said motor vehicle is deployed freeing said seat well for said pouch.

5. A cargo management system for a motor vehicle with at least one seat well as in claim 4, wherein said deployed pouch is deployed from at least one location in said motor vehicle and held in place by said point of attachment.

6. A cargo management system for a motor vehicle with at least one seat well as in claim 3, wherein the motor vehicle includes a quarter panel trim, and said pouch is stowed in the quarter panel trim when said pouch is in the stowed position.

7. A cargo management system for a motor vehicle with at least one seat well as in claim 1, wherein said pouch further comprises straps and pockets.

* * * * *